United States Patent [19]

Orlando et al.

[11] 4,294,954

[45] Oct. 13, 1981

[54] POLYCARBONATE COPOLYMERS

[75] Inventors: Charles M. Orlando, Schenectady; George R. Loucks, Scotia, both of N.Y.

[73] Assignee: General Electric Company, Schenectady, N.Y.

[21] Appl. No.: 103,215

[22] Filed: Dec. 13, 1979

[51] Int. Cl.$^3$ .............................................. C08G 63/62
[52] U.S. Cl. .............................. 528/174; 260/37 PC; 260/DIG. 24; 528/196; 528/201; 528/202; 528/204; 528/370; 528/372
[58] Field of Search ............... 528/202, 201, 204, 370, 528/372, 174, 196

[56] References Cited

U.S. PATENT DOCUMENTS

| | | | |
|---|---|---|---|
| 4,117,018 | 9/1978 | Cleveland et al. | 568/726 |
| 4,118,370 | 10/1978 | Sannes et al. | 260/45.7 W |
| 4,174,432 | 11/1979 | Niznik | 521/180 |
| 4,182,838 | 1/1980 | Mark et al. | 528/202 |
| 4,197,394 | 4/1980 | Hallgren | 528/198 |

OTHER PUBLICATIONS

Wielgosz et al., Plaste und Kautschuk, vol. 19, No. 12 (1972), pp. 902–904.

*Primary Examiner*—H. S. Cockeram
*Attorney, Agent, or Firm*—William A. Teoli; James C. Davis, Jr.

[57] ABSTRACT

Polycarbonate copolymers are provided consisting essentially of chemically combined bisphenol carbonate units and having from about 5 to 70 mole percent of such chemically combined bisphenol carbonate units in the form of o,p'-bisphenol dichloroethylene carbonate units. The polycarbonate copolymers have been found to possess valuable flame retardant properties and improved processability.

2 Claims, No Drawings

POLYCARBONATE COPOLYMERS

CROSS REFERENCE TO RELATED APPLICATIONS

Cross reference is made to copending application Ser. No. 10,496, filed Feb. 8, 1979 now U.S. Pat. No. 4,174,432 of George E. Niznik for Flame Retardant Rigid Thermoplastic Foams.

BACKGROUND OF THE INVENTION

Prior to the present invention, studies were made of dihaloethylene dihydric phenol polycarbonate copolymers as shown, for example, by Z. Wielgosz et al, Infrared Spectrascopic Investigation of Polycarbonates, Plaste Und Koutschuk, Vol. 19, (1972) No. 12, pages 902–904. Polycarbonate copolymers having chemically combined units derived from dihaloethylene dihydric phenol have also been utilized in the production of flame retardant rigid thermoplastic foams, as shown by copending application Ser. No. 10,496 of G. E. Niznik, filed Feb. 8, 1979 and assigned to the same assignee as the present invention. (See above). Such polycarbonate copolymers also can be found in Sannes et al U.S. Pat. 4,118,370, also assigned to the same assignee as the present invention.

It has been found that in the manufacture of polycarbonates based on the phosgenation of isopropylidene p,p'-dihydric phenol, isopropylidene-o,p'-dihydric phenol is often present as an impurity. This results from the formation of the o,p'-bisphenol-A in the manufacture of p,p'-bisphenol-A from the acid catalyzed condensation of phenol and acetone. In addition, the isopropylidene-o,p'-dihydric phenol has been found, as shown below in Table II, to act as a chain terminator causing a reduction in the molecular weight of the resulting polycarbonate. Those skilled in the art know, however, that asymmetric phenols, such as o,p'-dihydric phenol, generally effect a reduction in the glass transition temperature of the resulting polycarbonate. Accordingly, if it were possible to copolymerize an o,p'-dihydric phenol with a p,p-dihydric phenol to produce a high molecular weight polymer, the resulting polycarbonate copolymer would be expected to combine polycarbonate performance with improved processability.

Surprisingly, it has been discovered that unlike o,p'-isopropylidene dihydric phenol, o,p'-dihydric phenol of the formula,

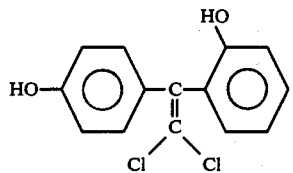
(1)

can be copolymerized with various dihydric phenols without significantly reducing the molecular weight of the resulting polycarbonate, while imparting improved processability and flame retardance.

STATEMENT OF THE INVENTION

There is provided by the present invention, polycarbonates consisting essentially of from about (a) 5 to 70 mole percent of chemically combined units of the formula,

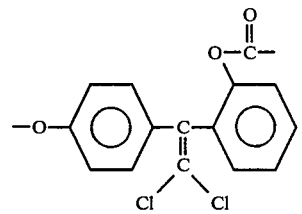

(b) about 95 to 30 mole percent of chemically combined units of the formula,

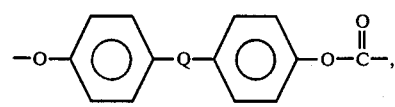

where Q is a member selected from the class consisting of

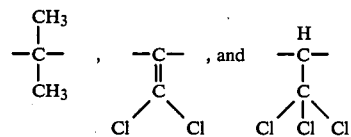

and mixtures thereof.

The polycarbonate copolymers of the present invention preferably can be made by copolymerizing the o,p'-dihydric phenol of formula (1), with one or more dihydric phenols of the formulas,

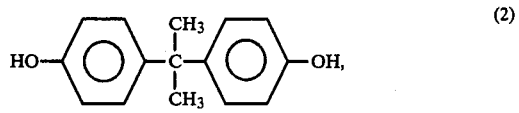
(2)

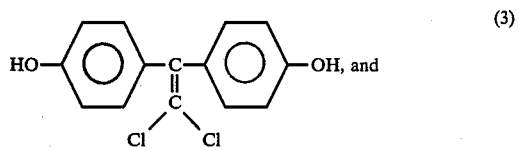
(3)

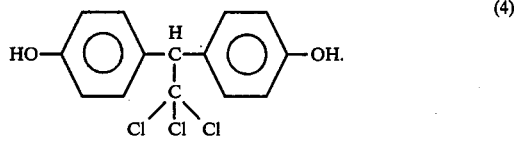
(4)

In addition to the above dihydric phenols, there also can be used one or more dihydric phenols such as the following to make the copolymers of the present invention, by copolymerization with o,p'-dihydric phenol of formula (1), where the resulting copolymerization mixture has at least 5 mole percent of dihydric phenol of formula (1) based on total moles of such dihydric phenol and dihydric phenol such as HO—(R—Z)$_a$R—OH where R is a C$_{(6-13)}$ divalent aromatic organic radical, Z is a member selected from Q above, -O-, -S-,

and a $C_{(4-8)}$ cycloaliphatic radical, and a is equal to 0 or 1.

There are included within the dihydric phenols of formula (5) dihydric phenols such as
4,4'-dihydroxy-diphenyl;
1,6-dihydroxy-naphthalene;
2,6-dihydroxy-naphthalene;
4,4'-dihydroxy-diphenyl methane;
4,4'-dihydroxy-1,1-diphenylethane
4,4'-dihydroxy-diphenyl-1,1-butane;
4,4'-dihydroxy-diphenyl-1,1-isobutane;
4,4'-dihydroxy-diphenyl-1,1-cyclopentane;
4,4'-dihydroxy-diphenyl-1,1-cyclohexane;
4,4'-dihydroxy-triphenyl methane;
4,4'-dihydroxy-diphenyl-2-chlorophenyl methane;
4,4'-dihydroxy-diphenyl-2,4-dichlorophenyl methane;
4,4'-dihydroxy-diphenyl-p-isopropylphenyl methane;
4,4'-dihydroxy-diphenylnaphthyl methane;
4,4'-dihydroxy-diphenyl-2,2-propane;
4,4'-dihydroxy-1-cyclohexyl-diphenyl-2,2-propane;
4,4'-dihydroxy-1-methyl-diphenyl-2,2-propane;
4,4'-dihydroxy-1-methoxy-diphenyl-2,2-propane;
4,4'-dihydroxy-1-isopropyl-diphenyl-2,2-propane;
4,4'-dihydroxy-3,3'-dimethyl-diphenyl-2,2-propane;
4,4'-dihydroxy-3,3'-dichloro-diphenyl-2,2-propane;
4,4'-dihydroxy-diphenyl-2,2-butane;
4,4'-dihydroxy-diphenyl-2,2-pentane;
4,4'-dihydroxy-diphenyl-2,2(4-methyl pentane);
4,4'-dihydroxy-diphenyl-2,2-n-hexane;
4,4'-dihydroxy-diphenyl-2,2-nonane;
4,4'-dihydroxy-diphenyl-4,4-heptane;
4,4'-dihydroxy-diphenyl phenylmethyl methane;
4,4'-dihydroxy-diphenyl-4-chlorophenylmethyl methane;
4,4'-dihydroxy-diphenyl-2,5-dichlorophenylmethyl methane;
4,4'-dihydroxy-diphenyl-3,4-dichlorophenylmethyl methane;
4,4'-dihydroxy-diphenyl-4-fluorophenylmethyl methane;
4,4'-dihydroxy-diphenyl-2-naphthylmethyl methane;
4,4'-dihydroxy-tetraphenyl methane;
4,4'-dihydroxy-diphenyl phenylcyano methane;
4,4'-dihydroxy-diphenyl-1,2-ethane;
4,4'-dihydroxy-diphenyl-1,10-n-decane;
bis-p-hydroxyphenyl-4,4'-diphenylether;
α,α,α',α'-tetramethyl-α,α'-(di-p-hydroxyphenyl)-p-xylylene;
α,α,α',α'-tetramethyl-α,α'-(di-p-hydroxyphenyl)-m-xylylene;
4,4'-dihydroxy-3,3'-dimethyl-diphenyl methane;
4,4'-dihydroxy-2,2'-dimethyl-diphenyl methane;
4,4'-dihydroxy-3,3'-dichloro-diphenyl methane;
4,4'-dihydroxy-3,3'-dimethoxy-diphenyl methane;
4,4'-dihydroxy-2,2',5,5'-tetramethyl-diphenyl methane;
4,4'-dihydroxy-diphenyl-5,5-nonane;
4,4'-dihydroxy-diphenyl-6,6-undecane;
4,4'-dihydroxy-diphenyl-3,3-butanone-2;
4,4'-dihydroxy-3,3'-dimethyl-diphenyl-3,3-butanone-2;
4,4'-dihydroxy-diphenyl-4,4-hexanone-3;
4,4'-dihydroxy-diphenyl ether;
4,4'-dihydroxy-diphenyl sulfide;
4,4'-dihydroxy-3,3'-dimethyldiphenyl sulfide;
4,4'-dihydroxy-diphenyl sulfoxide;
4,4'-dihydroxy-diphenyl sulfone;
4,4'-dihydroxy-3,3'-dichlorodiphenyl sulfone;

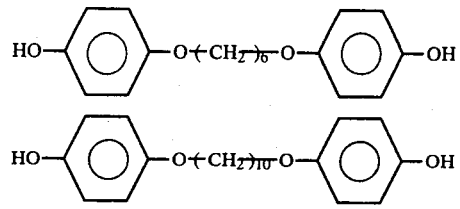

The polycarbonate copolymers or "copolymers" provided by the present invention can have number average molecular weights in the range of from about 5,000 to 30,000. The copolymers can have glass transition temperatures, "Tg's," of from 136° C. to 210° C. based on molecular weight and copolymer compositions. Chain-stoppers such as phenol, can be used to modify molecular weight of the resulting copolymers.

It has been found as a result of processing, copolymers consisting essentially of bisphenol units of formula (1) chemically combined with bisphenol units of formulas (3) or (4) are often subject to color change as a result of heat-age. Stabilizers can be utilized to reduce the effects of heat aging and those stabilizers found to be effective are shown in Sannes et al, U.S. Pat. No. 4,118,370.

The copolymers of the present invention can be made by interfacial polycondensation with phosgene. A mixture of dihydric phenol containing o,p'-dihydric phenol of formula (1) and one or more of the dihydric phenols as previously defined can be agitated in the presence of an organic solvent, an effective amount of tertiary organic amine, water and a chain stopper, such as phenol, if desired. The pH of the resulting mixture can be increased with an alkali metal hydroxide to a value of about 11. The mixture can then be phosgenated while maintaining the pH with additional alkali metal hydroxide. Upon termination of the phosgenation, the phosgenation system can be purged with inert gas, such as nitrogen. Separation of the aqueous inorganic phase and the washing and the extraction of the organic layer can be effected prior to effecting the separation of the copolymer by addition of a precipitating solvent, such as methanol or by steam precipitation. The copolymer then can be collected by filtration, further washed, and dried by use of heat and vacuum.

The copolymer of the present invention can be stabilized with esterified hindered phenols. The resulting stabilized copolymers can be molded or formed into films, sheets, fibers, laminates or other molded articles. Copolymers can be reinforced with 1 to 30 parts of filler, such as glass fiber, per 100 parts of copolymer and thereafter molded to a variety of shapes by conventional molding techniques.

In order that those skilled in the art will be better able to practice the invention, the following examples are given by way of illustration and not by way of limitation. All parts are by weight.

EXAMPLE 1

The synthesis of o,p'-bisphenol of formula (1) can be effected by initially converting o-bromoanisole to the corresponding chloral reaction product to produce the o,p'-tri chloride precursor in three steps, followed by a dehydrochlorination step in accordance with the following reaction scheme:

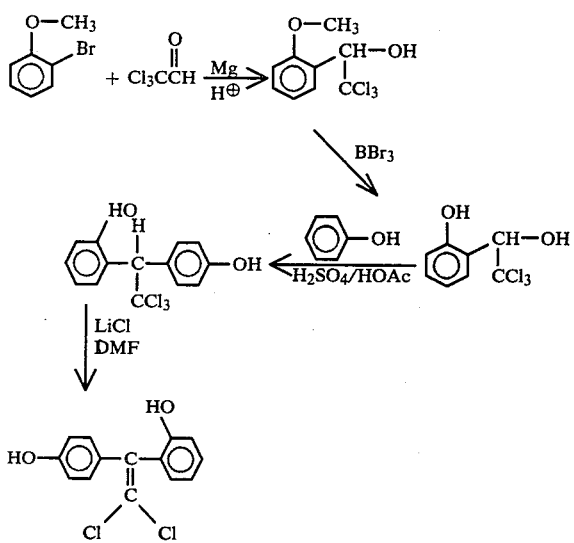

The above reaction scheme was carried out as follows:

There was added 200 parts of o-bromoanisole to a mixture of 357 parts of anhydrous diethyl ether and 24.3 parts of magnesium turnings while it was being stirred. The resulting mixture was stirred and refluxed for about ½ hour. There was then added 152.8 parts of chloral which had been cooled in an ice-water bath. When the addition of chloral was completed, the mixture was heated at reflux for two hours. The mixture was then allowed to cool to room temperature and then treated with dilute hydrochloric acid. The resulting carbinol was extracted with ether. The ether solution was washed with water and dilute sodium bicarbonate solution and dried over anhydrous sodium sulfate, filtered and evaporated to dryness. The crude carbinol was then distilled twice at 120° C./0.05 mm Hg. There was obtained 128 parts of the resulting carbinol.

There was added dropwise, 250 parts of boron tribromide to a solution of 128 parts of the above carbinol and about 534 parts of methylene chloride which was being stirred at room temperature. The mixture was then warmed for about 1 hour and poured into a stirred ice-water mixture. The mixture was then extracted with methylene chloride and the methylene chloride solution was washed with aqueous bicarbonate and water and dried over anhydrous sodium sulfate. The resulting solution was filtered and then evaporated to dryness.

There was obtained 95.5 parts of product. Based on method of preparation the product was the ortho-carbinol.

A mixture was stirred consisting of 94 parts of the above ortho-carbinol, about 180 parts of concentrated sulfuric acid, 104 parts of glacial acetic acid and 75 parts of phenol. After 20 hours of stirring, the mixture was poured into an agitated ether-water mixture. The ether layer was separated, washed with water, dried over anhydrous sodium sulfate, filtered and evaporated to dryness. There was obtained a yield of 79 parts of the corresponding trichloro-bisphenol.

Seventy-nine parts of the above trichloro-bisphenol was added to a mixture of 7.5 parts of lithium chloride in 378 parts of dimethylformamide. The resulting mixture was refluxed with stirring for approximately 16 hours. After cooling to room temperature, the dimethylformamide solution was added to about 1000 parts of water. The resulting product was then extracted with methylene chloride. The solution was washed with water, dried over anhydrous sodium sulfate, filtered and evaporated to dryness. There was obtained 53 parts of product having a melting point of 150°–154° C. after it was recrystallized from methanol-water. Based on method of preparation and suitable analytical data, the product was o,p'-bisphenol of formula (1).

A copolymer was made by phosgenating mixtures of o,p'-dihydric phenol of formula (1) and p,p'-dihydric phenol of formula (3). Phosgene was bubbled into a mixture of 1.85 parts of a 73/27 o,p',p,p'-bisphenol mixture of formulas (1) and (3), 7.15 parts of p,p'-diphenol of formula (3), 44 parts of methylene chloride, 30 parts of deionized water, 0.048 part of triethylamine and 0.060 part of phenol. In addition, a 50% aqueous sodium hydroxide solution was added to the mixture prior to phosgenation to increase its pH to 11. The mixture was phosgenated at a rate of 0.21 part/minute of phosgene for 21 minutes while additional sodium hydroxide solution was added to maintain the pH at 11.

The mixture was diluted with about 44 parts of methylene chloride and 50 parts of water. Upon removal of the organic layer, it was washed with a 5% hydrochloric acid solution and with water until the aqueous wash layer was neutral to litmus. The resulting methylene chloride solution was then pressure filtered through a glass-fiber filter and added slowly to about 400 parts of methanol in a Waring blender. There was obtained a 95% yield of copolymer consisting essentially of 85 mole percent of p,p'-bisphenol units and 15 mole percent of o,p'-bisphenol units.

The above procedure was repeated to provide for the production of a series of copolymers based on the phosgenation of dihydric phenol mixtures having from 1 percent of o,p'-dihydric bisphenol of formula (1) to 50 mole percent of such dihydric phenol using the p,p'-dihydric phenol of formula (3) as the other dihydric phenol constituent. The results obtained are shown in Table I below:

TABLE I

| | Copolycarbonates of p,p'-Bisphenol of Formula (3) and o,p'-Bisphenol of Formula (1) | | | | | | |
|---|---|---|---|---|---|---|---|
| Polymer No. | Composition (mole % of o,p'-Bisphenol) | Intrinsic Viscosity[c] | Glass Transition Temp (C.°) | GPC[e] | | | VPO[f] |
| | | | | $\overline{M}w$ | $\overline{M}n$ | $\overline{M}w/\overline{M}n$ | $\overline{M}n$ |
| 1[a] | 0 | .49 | 165 | 64,721 | 14,442 | 4.48 | 15,314 |
| 2[b] | 0 | Very High[d] | — | — | — | — | — |
| 3[a] | 1 | .50 | 164 | 68,780 | 15,755 | 4.37 | 15,995 |
| 4[a] | 3 | .50 | 166 | 65,838 | 14,393 | 4.57 | 14,635 |

TABLE I-continued

Copolycarbonates of p,p'-Bisphenol of Formula (3) and o,p'-Bisphenol of Formula (1)

| Polymer No. | Composition (mole % of o,p'-Bisphenol) | Intrinsic Viscosity[c] | Glass Transition Temp (C.°) | GPC[e] Mw | Mn | Mw/Mn | VPO[f] Mn |
|---|---|---|---|---|---|---|---|
| 5[a] | 5 | .46 | 164 | 61,289 | 15,719 | 3.90 | 12,118 |
| 6[a] | 10 | .45 | 161 | 60,166 | 14,542 | 4.14 | 15,178 |
| 7[a] | 15 | .40 | 162 | 56,193 | 13,218 | 4.25 | 12,056 |
| 8[b] | 25 | 2.8 | — | — | — | — | — |
| 9[b] | 50 | 1.0 | 155 | — | — | — | — |
| 10[b] | 100 | .58 | 136 | — | — | — | — |

[a]Phenol added as chain-stopper (60 mg per 9.0g monomer)
[b]Unchain-stopped reactions
[c]dl/g in CHCl₃ at 25° C.
[d]Not completely soluble in CHCl₃ at 25° C.
[e]Gel Permeation Chromatography (polystyrene standards)
[f]Vapor Pressure Osmometry The above results show that increasing levels of o,p'-bisphenol of formula (1) show a reduction in the Tg of the resulting copolymer approaching the lower Tg limit of 136° C. of the homopolymer. This reduction in Tg can provide improved processability of the resulting polymer.

In addition to the copolymers of Table I, another series of polycarbonate copolymers was prepared by the same procedure from the bisphenol of formula (2), commonly referred to as "bisphenol-A" and o',p'-dihydric phenol of the formula,

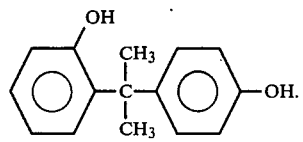

(6)

The dihydric phenol of formula (6) was obtained by extraction from a plant bisphenol-A impurity stream and purified by recrystallization. The intrinsic viscosity of the bisphenol-A copolymer series was compared with the intrinsic viscosity of the copolymer series of formula (1) and formula (3) as shown in the following table, where the copolymers were prepared in the absence of chain-stopper:

TABLE II

| | Copolymer Intrinsic Viscosity Data | |
|---|---|---|
| o,p-Bisphenol (mol %) | Formula (1) and Formula (3) units | Formula (2) and Formula (6) units |
| 0 | — | 3.1 |
| 2 | — | 1.7 |
| 3 | — | 1.0 |
| 5 | — | .56 |
| 10 | — | .52 |
| 25 | 2.8 | .37 |
| 50 | 1.0 | .20 |
| 100 | .58 | .11 |

The above results establish that substantial increases in the mole percent of o,p'-dichlorobisphenol of formula (1) in dihydric phenol mixtures do not result in significant reduction in molecular weight of copolymer obtained by phosgenation of such mixtures. It was found, however, that when mixtures of o,p'-bisphenol-A and p,p'-bisphenol-A were phosgenated, that a significant reduction in intrinsic viscosity occurred at about 2 mole percent of the o,p'-bisphenol-A based on the total moles of bisphenol in the phosgenation mixture.

The following table shows a further comparison of the glass transition temperatures of the polycarbonate copolymer having formula (1) units and formula (3) units with bisphenol-A copolymer having formula (6) units:

| o,p-Bisphenol (mol %) | Copolymer (Tg's) Formulas (1) & (3) | Formulas (2) & (6) |
|---|---|---|
| 0 | 165 | 148 |
| 1 | 164 | — |
| 3 | 166 | 144 |
| 5 | 164 | — |
| 10 | 161 | 151 |
| 15 | 162 | 146 |
| 25 | — | 147 |
| 50 | 155 | — |
| 100 | 136 | 143 |

The reduction of Tg by o,p'-bisphenol of Formula (1) is significantly greater than by the o,p'-bisphenol of formula (6) resulting in greater improvement in polymer processability.

EXAMPLE 2

The homopolycarbonate of o,p'-bisphenol of formula (1) was prepared by phosgenating a pure sample of the bisphenol synthesized according to the method described in Example 1. Phosgene was bubbled into a mixture of 2.10 part of the o,p'-bisphenol, 0.012 part triethylamine, 25 parts of methylene chloride and 35 parts of deionized water. In addition, sufficient 50% aqueous sodium hydroxide solution was added to the mixture to increase its pH to 11 prior to phosgenation. The mixture was phosgenated at a rate of 0.11 part/minute of phosgene for 10 minutes, while additional sodium hydroxide solution was added to maintain the pH at 11.

The mixture was diluted with 20 parts of methylene chloride and 25 parts of deionized water. The organic layer was separated and washed successively with a 5% hydrochloric acid solution and water until the aqueous wash layer was neutral to litmus. The methylene chloride solution was then added slowly to about 200 parts of methanol in a Waring blender. There was obtained a 94% yield of a material having an intrinsic viscosity of 0.58 dl/g (CHCl₃ at 25° C.). Based on method of preparation, the material was a homopolymer consisting essentially of chemically combined units of the formula,

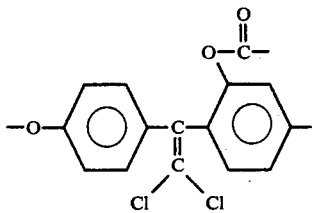

A film of the above homopolymer is cast from methylene chloride onto a glass substrate. The resulting film is found to be tough and exhibits flame retardant properties. It is useful as an insulating material for wire.

Although the above examples are directed to only a few of the very many variables for making the copolymers of the present invention, it should be understood that the copolymers of the present invention include a much broader class of copolymers of formula (1) and formula (5) units

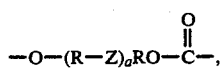

where R, Z and a are as previously defined.

What we claim as new and desire to secure by Letters Patent of the United States is:

1. Polycarbonates consisting essentially of about
  (a) 5 to 70 mole percent of carbonate units of the formula,

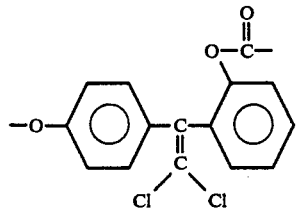

chemically combined with about
  (b) 95 to 30 mole percent of carbonate units of the formula,

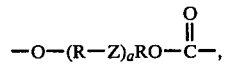

where R is a $C_{(6-13)}$ divalent aromatic organic radical, Z is a member selected from —S—, —O—,

and a $C_{(4-8)}$ cycloaliphatic radical and a is equal to 0 or 1.

2. Polycarbonates consisting essentially of from about
  (a) 5 to 70 mole percent of carbonate units of the formula,

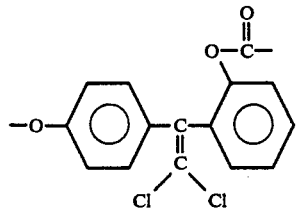

chemically combined with about
  (b) 95 to 30 mole percent of carbonate units of the formula,

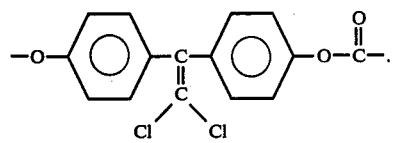

* * * * *